Jan. 18, 1944.　　　R. I. RICKSHAM　　　2,339,722
CHEESE CUTTER
Filed Jan. 2, 1943　　　2 Sheets-Sheet 1
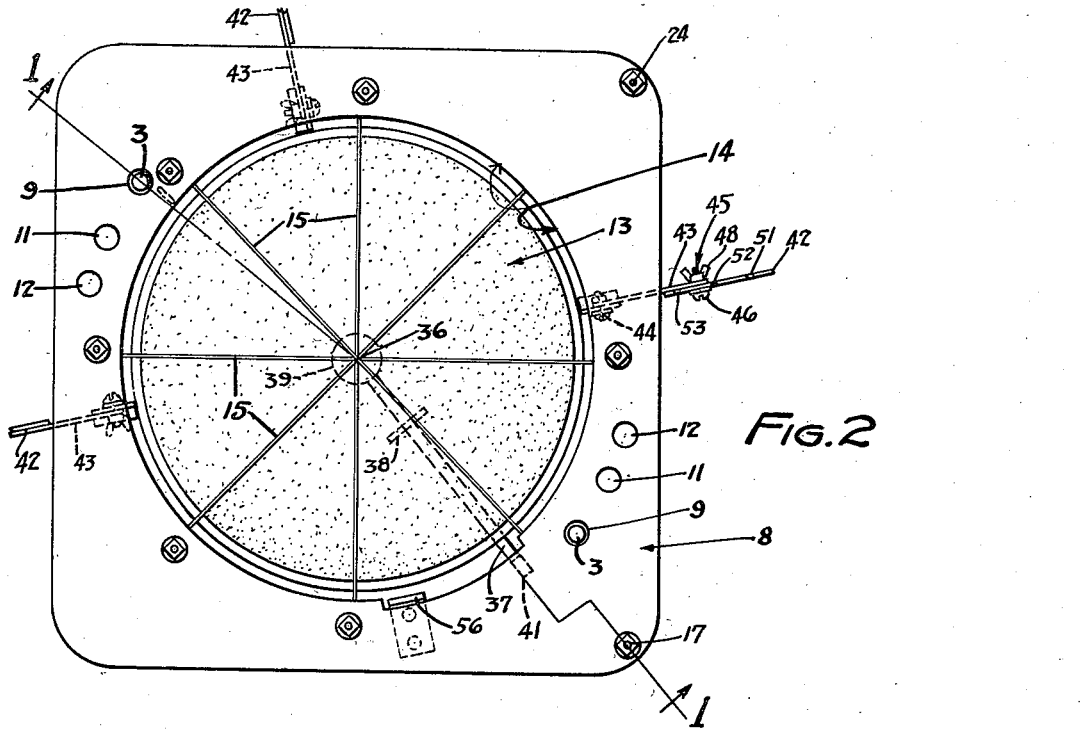
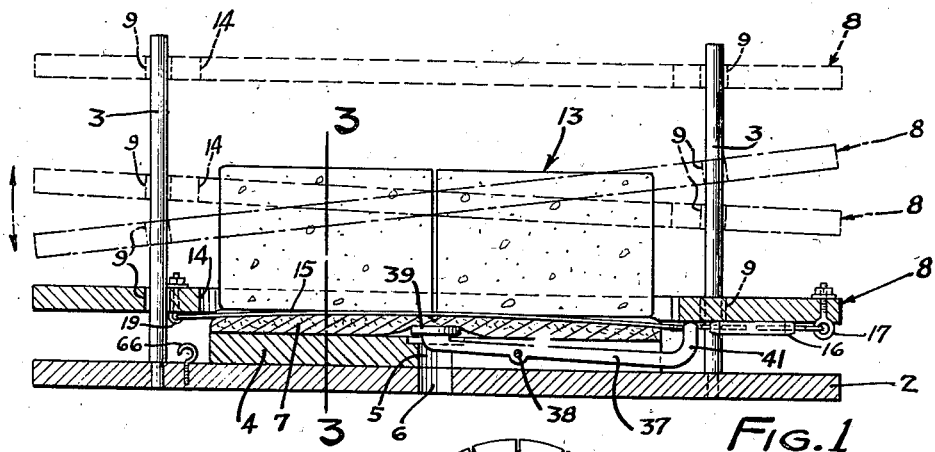
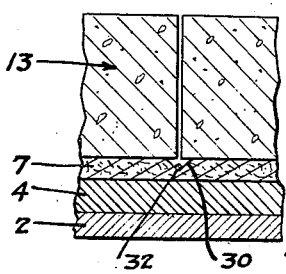
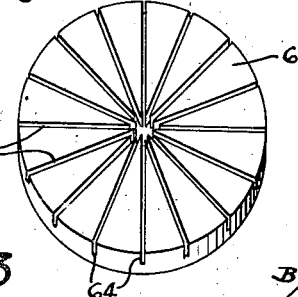
INVENTOR
ROY I. RICKSHAM
By Paul, Paul + Moore
ATTORNEYS Jan. 18, 1944.   R. I. RICKSHAM   2,339,722
CHEESE CUTTER
Filed Jan. 2, 1943   2 Sheets-Sheet 2
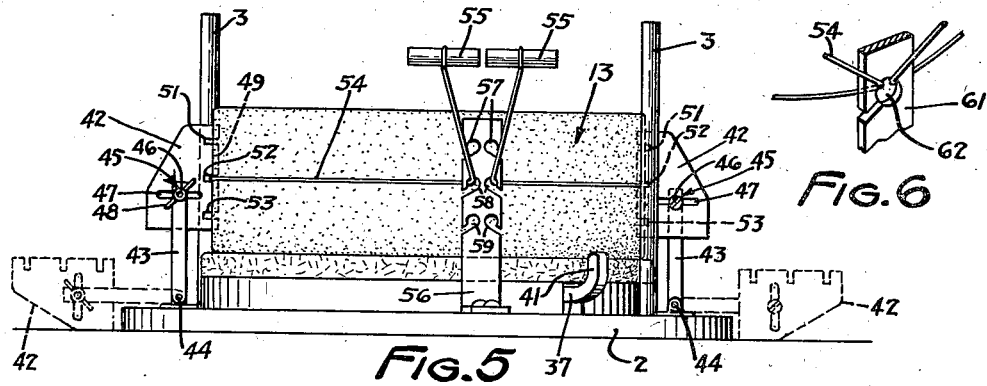
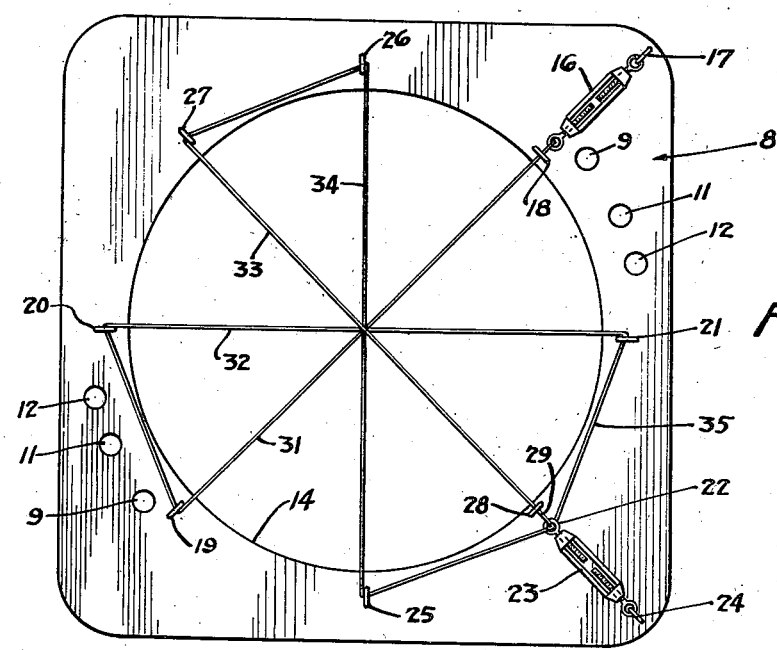
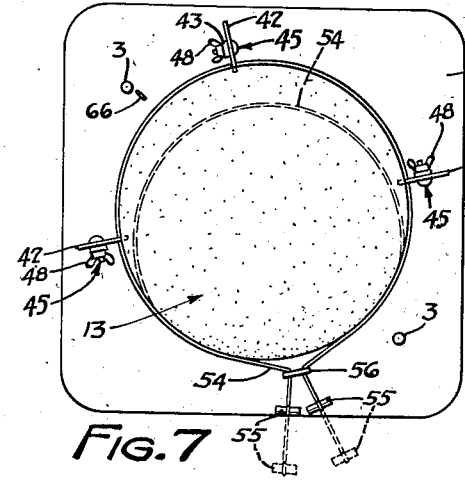
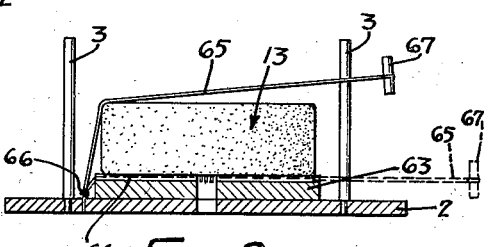
INVENTOR
ROY I. RICKSHAM
BY Paul, Paul & Moore
ATTORNEYS Patented Jan. 18, 1944

2,339,722

UNITED STATES PATENT OFFICE 2,339,722

CHEESE CUTTER

Roy I. Ricksham, St. Louis Park, Minn.

Application January 2, 1943, Serial No. 471,112

10 Claims. (Cl. 31—30)

This invention relates to new and useful improvements in cheese cutters, and particularly to such an apparatus which may be used in stores and other places where cheese is sold, whereby a cheese, regardless of shape or size, may be quickly and conveniently cut into a plurality of pieces without waste.

Heretofore, it has been more or less common practice, when a customer desires to purchase a piece of cheese, to have the attendant cut a segment or piece of cheese from the usual cylindrical cake of cheese at the time the purchase is made. Some cheeses are more or less difficult to cut with a knife, which is a common tool used for such purposes, because of the inherent nature of the cheese to adhere to the surface of the knife blade. Some cheeses are also rather hard, which requires that considerable pressure be exerted on the blade of the knife to force it thru the cheese. To facilitate the cutting of cheese, wires have been utilized for such purposes. These have been supported in various types of frames whereby the wire could be sufficiently tensioned to permit them to be forced thru the cheese.

In merchandising cheese, I have found that the sales may be greatly increased if a conventional cake of cheese is previously cut into a plurality of salable pieces, and each piece is weighed and wrapped and the price marked thereon. The wrapped pieces of cheese may then be neatly placed on a table or on a counter where customers may readily and conveniently select a piece of the desired size or weight, without having to wait for an attendant to cut or slice a piece from the main body or cake of cheese.

To thus merchandise cheese, it is highly desirable that a cutter be provided whereby a whole cheese may be quickly and conveniently cut into a plurality of pieces of uniform size, or of various sizes, after which each piece may be weighed and wrapped, and the price attached thereto for convenient distribution to the trade.

It is therefore an object of the present invention to provide a cheese cutter which is so constructed that it may be utilized for cutting cheeses of different sizes and shapes without waste and whereby each piece will be neatly formed.

A further object is to provide a cheese cutter comprising a cheese supporting member for supporting a cheese, and a frame vertically movable with respect to the cheese supporting member, and having an opening therein adapted to receive the cheese, and a plurality of cutting wires stretched across said opening whereby when the frame is moved downwardly over the cheese, the wires will cut thru the cheese and divide it into a number of segmental pieces.

A further object is to provide a cheese cutter comprising a suitable base having a cushion member mounted thereon upon which the cheese is directly supported, and said base having guide means thereon for guidingly supporting a suitable frame carrying a plurality of cutting wires which may be forced downwardly thru the cheese by downward movement of the frame, said cushion member permitting the wires to pass completely thru the cheese.

A further object is to provide a cheese cutter comprising a frame having an opening therein, across which a plurality of wire strands are tensioned, said strands being integrally formed of a single wire having means for tensioning it whereby all of said strands may be uniformly tensioned.

A further object is to provide an apparatus of the class described comprising a suitable base having a cushion member mounted thereon, upon which the cheese is directly supported, and means being provided for exerting an upward pressure against the central portion of said cushion member, when the cutting elements are forced thru the cheese, thereby to cause the cutting elements to pass completely thru the cheese.

Other objects of the invention reside in the novel mounting of the cutter frame upon the base, whereby a wobbling or rocking motion may be imparted to said frame in the operation of forcing the cutting wires thru the cheese, thereby to facilitate said operation; in the pivoted arm mounted on the base adapted to be actuated by the cutting frame, thereby to exert an upward pressure against the central portion of the cushion member, as the cutting elements approach the limit of their downward movement, whereby the wires may readily cut completely thru the cheese; in the guide means provided around the circumference of the cheese for supporting the horizontal cutting wire in proper position, prior to pulling it thru the cheese; and in the simple and inexpensive construction of the apparatus whereby it may be manufactured in quantity production at small cost.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a vertical sectional view substantially on the line 1—1 of Figure 2, showing the general construction of the apparatus;

Figure 2 is a plan view of Figure 1;

Figure 3 is a detail sectional view on the line 3—3 of Figure 1, showing one of the cutting wires having passed completely thru the cheese;

Figure 4 is a bottom view of the cutter frame only, showing the manner of supporting the cutting wire thereon;

Figure 5 is an elevational view of the cheese cutter, showing the means for horizontally cutting the cheese;

Figure 6 is a perspective view showing a modified form of guide for the horizontal cutting wire;

Figure 7 is a plan view of Figure 5;

Figure 8 is a view showing a modified construction wherein a single wire is used to vertically cut the cheese into a plurality of pieces; and Figure 9 is a perspective view of the cheese supporting member shown in Figure 8.

The novel cheese cutter herein disclosed is shown comprising a suitable base member 2 which may be of any dsired configuration. A pair of upright guide posts 3 are mounted on the base, preferably in diametrically opposed relation. A plate 4 is shown secured to the central portion of the base 2 and preferably has an opening 5 therein aligned with a similar opening 6 provided in the base 2.

An important feature of the present invention resides in the unique construction of the upper surface of the plate 4 which supports the cheese. As best shown in Figure 1, a cushion member 7 of any suitable material which will readily yield to pressure, is secured to the plate 4, and upon this cushion member the cheese is directly supported.

A suitable frame, generally designated by the numeral 8, and which will hereinafter be referred to as the cutting frame, is mounted for vertical sliding movement on the guide posts 3. The frame 8, as best shown in Figure 2, has a series of openings 9, 11 and 12 therein, adapted to selectively receive the posts 3, and whereby the cheese, designated by the numeral 13, may be cut into a plurality of segmental pieces of varying sizes. The frame 8 has an enlarged central opening 14 therein for receiving the cheese, as will readily be understood by reference to Figures 1 and 2.

A plurality of cutting elements 15 are carried by the frame 8 and traverse the opening 14 therein, as shown. These cutting elements are preferably made from a suitable size wire which in the present instance is in one piece, as shown in Figure 4. One end of the wire is shown secured to a turnbuckle 16 having one end anchored to the frame 8, as shown at 17 in the upper right-hand corner of Figure 4. From the turnbuckle 16, the wire passes thru a suitable eye 18, thence across the opening 14 thru eyes 19 and 20, after which it again traverses the opening 14 and is threaded thru an eye 21, and there thru an eye 22 provided at one end of a turnbuckle 23. The turnbuckle 23 is anchored at 24 to the frame 8. From the eye 22 of the turnbuckle 23, the wire passes thru an eye 25, thence across the opening 14 and thru eyes 26 and 27, and again across the opening 14 and thru an eye 28. The end 29 of the wire is suitably secured to the eye 22 of the turnbuckle 23.

By thus threading a single wire thru the various eyes secured to the frame 8, and securing the ends thereof to the turnbuckles 16 and 23, the wire strands 31, 32, 33 and 34, which form the cutting elements of the apparatus, may be uniformly tensioned, which is of utmost importance in an apparatus of this type. It will also be noted that the wire strand 35 between the eyes 21 and 25, passes thru the eye 22 of the turnbuckle whereby it too is tensioned when the turnbuckle 23 is operated to increase the tension in the wire.

Another important feature of the invention resides in the relative sizes of the guide openings 9, 11 and 12 in the cutter frame 8, which, it will be noted by reference to Figure 2, are relatively larger in diameter than the diameter of the guide posts 3. By thus making the guide openings larger than the posts, the cutter frame 8 may be given a wobbling or rocking action, as the cutting wires are forced downwardly thru the cheese, as indicated by the dotted lines in Figure 1. By thus wobbling or rocking the cutter frame during the cutting operation, the cutting wires may be more easily forced thru the cheese, as will readily be understood.

The cushion element 7 supported on the plate 4 of the base, is, as heretofore stated, made of a suitable yieldable material which may readily yield to pressure, thereby to allow the cutting wires to pass completely thru the cheese, at the termination of the cutting operation.

By reference to Figures 1 and 3, it will be noted that when the cutting wires engage the cushion member 7, said member will yield, as shown at 30 in Figure 3, whereby the cutting wires may readily pass completely thru the cheese.

Another feature of the invention resides in the means provided for assuring that the central portion of the cheese will be completely severed by the cutting wires, each time the cutting frame 8 is moved downwardly, in the operation of cutting the cheese. Because of the cutting wires crossing one another at the center of the opening 14 in the frame 8, as shown at 36 in Figure 2, considerable pressure is exerted there against the wires when they are forced thru the cheese, whereby the wires form catinary curves, as clearly illustrated in Figure 1, which may, at times, prevent the wires from cutting completely thru the cheese at the center thereof.

To assure complete severance of the cheese at its center, means is provided for exerting an upward pressure on the center of the cushion element 7, as the cutting frame 8 approaches the limit of its downward movement.

Such means is best shown in Figure 1, and comprises an arm 37 mounted on a pivot 38 secured in the plate 4 of the base. The arm 37 has an enlarged head 39 at its inner end engaging the center of the cushion member 7. The opposite end portion 41 of the arm is shown bent upwardly whereby it may be engaged by the frame 8 when the latter approaches the limit of its downward movement.

It will thus be noted by reference to Figure 1, that when the frame 8 is being forced downwardly in the operation of cutting the cheese, it will engage the upturned end 41 of the arm 37 just before reaching the limit of its downward movement. Such engagement of the frame 8 with the arm 41 will cause the inner end or head 39 of the arm to be elevated against the cushion element 7, thereby pressing the central portion of the cushion element up against the bottom of the cheese whereby the cutting wires may readily pass completely thru the cheese, as will readily be understood.

Another feature of the invention resides in the means provided for cutting the cheese horizontally. To thus cut the cheese, a plurality of guide elements or plates 42, preferably three, are mounted around the circumference of the cheese. These plates are shown supported on arms 43, having their lower ends pivoted at 44 to the base 2. The guide elements or blades 42 are adjustably secured to the upper ends of the arms 43 by suitable adjusting devices, generally designated by the numeral 45, each comprising a bolt 46 and a wing nut 48. The bolts 46 are received in slots 47 provided in the guide plates 42.

The inner edges 49 of the guide blades 42 are preferably sharpened so that they may readily be pressed into the periphery of the cheese, as shown in Figure 5. Guide slots or notches 51 are provided in each blade 42 adapted to receive and support a cutting wire 54 shown provided with suitable hand grips 55. Guide slots or notches 51, 52 and 53 cooperate to retain the wire 54 in proper position upon the cheese 13 before the wire is placed under tension to draw it thru the cheese.

To guide the ends of the cutting wire 54, an upright post 56 is secured to the base 2, and has a plurality of pairs of guide openings 57, 58 and 59 therein adapted to receive the end portions of the cutting wire 54, as illustrated in Figure 5. The pairs of guide openings 57, 58 and 59 are vertically aligned with the guide slots 51, 52 and 53 of the blades 42, as will be noted by reference to Figure 5. When it is desired to cut the cheese in two halves, the cutting wire 54 is supported in the guide slots 52 of the blades 42 and in the guide openings 58 of the post 56. The operator then grasps the handles 55 of the wire and draws the wire 54 thru the cheese, as clearly illustrated in Figure 7. If it is desired to cut the cheese into thinner pieces, the wire may be moved into the upper guide slots 51 or into the lower guide slots 53.

In some instances, it may be desired to vary the sizes or weights of the various pieces of cheese cut from the large cheese, and this may readily be accomplished by cutting the cheese 13 thru its diameter on an incline. For example, the wire 54 may be passed thru the guide slot 53 at one side of the cheese and then the guide 51 at the oposite side of the cheese, whereby the cheese will be cut on a diagonal. By thus drawing the wire thru the cheese while disposed at an angle, it will readily be noted that the sizes of the various pieces cut from the cheese may vary considerably in size. The weights of the various pieces may be further varied, depending upon the guide openings utilized in the cutting frame 8.

In Figure 6 there is shown a guide post 61 similar to the post 56 shown in Figure 5, having but a single guide opening 62 for receiving the ends of the wire 54, as will be understood.

In Figures 8 and 9 I have shown a cheese cutter of slightly different construction in which the base 2 is provided with a non-yieldable member 63 having a plurality of radial slots 64 in its upper surface for receiving a cutting wire 65, when the latter is pulled downwardly thru the cheese, as indicated in dotted lines in Figure 8.

One end of the wire 65 is shown attached to the base 2 by a suitable eye 66, and the opposite end of the wire is provided with a suitable handle 67 to facilitate pulling it thru the cheese, as will readily be understood.

The novel cheese cutter herein disclosed has been found extremely practical and useful in the operation of merchandising cheese in places where cheese is retailed in large quantities. By its use, a cheese, regardless of size or shape, may be cut into numerous pieces, all of uniform size and weight if desired, or the cheese may readily be cut into pieces of different sizes. The severed pieces may then be independently wrapped and placed on a display counter, with the weight and price plainly marked thereon. I have found that by thus precutting and wrapping the cheese, and placing the wrapped pieces on a display counter with the price plainly marked thereon, the sale of cheese is greatly stimulated.

In some instances it may also be desirable not to wrap the severed pieces, in which case the cheese may be cut into any desired number of pieces, and the whole cheese may then be placed in a refrigerator, already cut for immediate distributing.

The cushion element 7 provided on the base for supporting the cheese, may be made of any suitable material applicable for the purpose, and which may readily be kept clean and sanitary, which is necessary in apparatus of this general type. It provides a smooth surface for supporting the cheese, and at the same time has sufficient yieldability to allow the cutting wires to pass completely thru the cheese, when the cutting frame is moved downwardly to the position shown in full lines in Figure 1.

The base 2 and frame 8, and also the guide posts 3, may be made of any suitable material applicable for the purpose. Wood has proven a very satisfactory material from which to make these parts, whereby they may readily be obtained without restriction. Wood also provides a very substantial structure which is extremely light in weight so that it may readily be moved about from place to place when necessary.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrated only, and that my invention is not limited thereto.

I claim as my invention:

1. In an apparatus of the class described, a cushion member adapted to support a cheese, a frame mounted for vertical movement relative to the cushion member and having an opening therein for receiving the cheese, a plurality of cutting elements carried by said frame and traversing the opening therein whereby when the frame is moved downwardly over the cheese, said cutting elements will cut the cheese, and means for exerting an upward pressure on the central portion of the cushion member, when the frame approaches the limit of its downward movement, thereby to cause the cutting elements to pass completely thru the cheese.

2. In an apparatus of the class described, a base plate having a cushion member mounted thereon adapted to support a cheese, a frame mounted for vertical movement relative to the base plate and having an opening therein for receiving the cheese, a plurality of cutting wires carried by said frame and traversing the opening therein whereby when the frame is moved downwardly over the cheese, said wires will cut the cheese into a plurality of pieces, and means made operable by downward movement of the frame to exert an upward pressure on the central portion of the cushion member, when the frame approaches the limit of its downward movement, thereby to cause the cutting wires to pass completely thru the cheese.

3. In an apparatus of the class described, a base plate having a cushion member thereon adapted to support a cheese, a frame mounted for vertical movement relative to the base plate and having an opening therein for receiving the cheese, a plurality of cutting wires carried by said frame and traversing the opening therein whereby when the frame is moved downwardly over the cheese, said cutting wires will cut the cheese into a plurality of pieces, and pivoted means associated with said cushion member and positioned to be actuated by said frame, when the frame approaches the limit of its downward movement, thereby to exert an upward pressure on the cushion element to cause the cutting wires to pass completely thru the cheese.

4. In an apparatus of the class described, a yieldable cheese supporting member adapted to support a cheese, a frame mounted for vertical movement relative to said member and having an opening therein for receiving the cheese, a plurality of cutting wires carried by said frame and traversing the opening therein, whereby when the frame is moved downwardly over the cheese, said cutting wires will cut the cheese into a plurality of pieces, and a pivoted member made operable by said frame to slightly elevate the central portion of said yieldable cheese supporting member, thereby to cause the cutting wires to pass completely thru the cheese.

5. In an apparatus of the class described, a base plate, a cushion member mounted on the base and adapted to support a cheese, a frame mounted for vertical movement relative to the base and having an opening therein for receiving the cheese, a plurality of cutting wires carried by said frame and traversing the opening therein, whereby when the frame is moved downwardly over the cheese, said wires will cut the cheese into a plurality of pieces, and a pivoted arm having one end engaging the central portion of the cushion member and having its opposite end positioned to be engaged by said frame, when the frame approaches the limit of its downward movement, whereby the arm is actuated to slightly elevate the central portion of the cushion member to cause the wires to pass completely thru the cheese.

6. In an apparatus of the class described, a base having means thereon for supporting a cheese, a frame mounted for vertical movement and having an opening therein for receiving the cheese, a plurality of cutting wires carried by said frame and traversing the opening therein, and guide means on the base for guiding the frame during the cutting operation, said guide means permitting a wobbling action to be imparted to the frame, thereby to facilitate forcing the cutting wires thru the cheese.

7. In an apparatus of the class described, a base having means thereon for supporting a cheese, a frame mounted for vertical movement relative to the base and having an opening therein for receiving the cheese, a plurality of cutting wires carried by said frame and traversing the opening therein, guide means on the base for guiding the frame during the cutting operation, and means on said frame whereby the frame may be rotatively adjusted on the base to cause the cutting means to engage the cheese between the cuts originally made thereby, whereby, to divide the cheese may be cut into a relatively greater number of pieces.

8. In an apparatus of the class described, a base having means thereon for supporting a cheese, upright guide posts on said base, a frame having a plurality of pairs of guide openings therein adapted to selectively receive said posts, said frame carrying a plurality of cutting wires and being vertically movable on said posts in the operation of cutting the cheese, and said pairs of guide openings providing means whereby the frame may be rotatively adjusted with respect to the cheese, thereby to cut the cheese into a relatively greater number of pieces.

9. In an apparatus of the class described, a base having a means thereon for supporting a cheese, a frame mounted for vertical movement and having an opening therein for receiving the cheese, a plurality of wire securing elements secured to said frame and disposed around said opening, a single wire supported on said elements and repeatedly traversing the opening in said frame in different directions and serving as cutting elements for the cheese, a single device for uniformly tensioning all of the portions of said wire traversing said opening, and means for guiding the frame during the cutting operation.

10. In an apparatus of the class described, a base having means thereon for supporting a cheese, a frame mounted for vertical movement and having an opening therein for receiving the cheese, a plurality of eyes secured to said frame and disposed in spaced relation around said opening, a single wire threaded thru said eyes and having one end suitably anchored to the frame, said wire traversing the opening in said frame several times in different directions and serving as cutting elements for the cheese, and a tensioning device secured to said frame and having the opposite end of the wire attached thereto, said tensioning device being operable to uniformly tension all of the wire strands traversing the frame opening.

ROY I. RICKSHAM.